(12) United States Patent
He et al.

(10) Patent No.: US 11,416,326 B2
(45) Date of Patent: Aug. 16, 2022

(54) SYSTEMS AND METHODS FOR FAILURE DIAGNOSIS USING FAULT TREE

(71) Applicant: SAP SE, Walldorf (DE)

(72) Inventors: Jie He, Shanghai (CN); Jianwei Chen, Shanghai (CN); Lin Cai, Shanghai (CN); Xiaoling Zhou, Shanghai (CN); Xuemin Wang, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/006,449

(22) Filed: Aug. 28, 2020

(65) Prior Publication Data
US 2022/0066853 A1 Mar. 3, 2022

(51) Int. Cl.
*G06F 11/07* (2006.01)

(52) U.S. Cl.
CPC ........ *G06F 11/079* (2013.01); *G06F 11/0709* (2013.01); *G06F 11/0751* (2013.01)

(58) Field of Classification Search
CPC . G06F 11/079; G06F 11/0709; G06F 11/0751
See application file for complete search history.

(56) References Cited

U.S. PATENT DOCUMENTS

| 6,785,636 | B1 | 8/2004 | Darken et al. | |
|---|---|---|---|---|
| 2003/0070108 | A1* | 4/2003 | Groen | G06Q 10/0635 714/1 |
| 2007/0225948 | A1* | 9/2007 | Takezawa | G06Q 10/06 703/1 |
| 2011/0137703 | A1* | 6/2011 | Dugan | G06Q 40/08 705/7.28 |

(Continued)

FOREIGN PATENT DOCUMENTS

| CN | 102637019 A | 8/2012 |
|---|---|---|
| CN | 103441869 A | 12/2013 |
| CN | 106050580 B | 10/2018 |

OTHER PUBLICATIONS

Bedford and Cooke, "Probabilistic Risk Analysis: Foundations and Methods," Cambridge University Press, Chapter 6.10—Estimating the probability of the top event, (pp. 117-118), 2001.

(Continued)

*Primary Examiner* — Jigar P Patel
(74) *Attorney, Agent, or Firm* — Klarquist Sparkman, LLP

(57) ABSTRACT

A computer-implemented method for failure diagnosis using fault tree can include: receiving a fault tree comprising a node representing a top event, a plurality of nodes representing respective basic events, and one or more logic gates connecting the plurality of nodes representing the respective basic events to the node representing the top event; obtaining reliability parameters corresponding to the basic events; calculating fault tree importance measures corresponding to the basic events; calculating failure impact factors of the top event corresponding to the basic events, wherein the failure impact factors of the top event are products of the corresponding reliability parameters and the corresponding fault tree importance measures; ranking the basic events based on the failure impact factors of the top event; and identifying a most significant contributor to the top event, wherein the most significant contributor is a basic event having the highest failure cause probability of the top event.

18 Claims, 12 Drawing Sheets

(56) References Cited

U.S. PATENT DOCUMENTS

| | | | | |
|---|---|---|---|---|
| 2012/0317058 A1* | 12/2012 | Abhulimen | .......... | G06N 3/0427 706/2 |
| 2013/0024417 A1* | 1/2013 | Joanni | .................... | G06N 7/005 706/59 |
| 2015/0142402 A1* | 5/2015 | Ramesh | .................. | G06F 30/20 703/7 |
| 2015/0301908 A1* | 10/2015 | Tadano | ............... | G06F 11/1469 714/19 |
| 2021/0081289 A1* | 3/2021 | Marty | ..................... | G06F 30/00 |
| 2021/0200200 A1* | 7/2021 | Akula | .................. | G05B 23/024 |

OTHER PUBLICATIONS https://www.relyence.com/2020/03/12/ft-importance-measures/, "Fault Tree Analysis: Understanding Importance Measures," Relyence. com, Mar. 12, 2020, 6 pages.

Graves, "A fully Bayesian approach for combining multi-level information in multi-state fault tree quantification," Reliability Engineering and System Safety 92 (2007) 1476-1483.

Kromodimoeljo et al., "Automatic Generation of Minimal Cut Sets," School of IT&EE, The University of Queensland, EPTCS 184, 2015, 15 pages.

Medkour et al., "Transformation of Fault Trees into Bayesian Networks Methodology for Fault Diagnosis," Mechanika, Kaunas University of Technology, 23(6), pp. 891-899, 2017.

M. Pandey, "Fault Tree Analysis," Univesity of Waterloo, CIVE 240—Engineering and Sustainable Development, downloaded Jul. 21, 2020 from http://www.civil.uwaterloo.ca/maknight/courses/CIVE240-05/Week%2011/Fault%20Tree%20Analysis.pdf, 18 pages.

Sun et al., "On Several Typical Importances in Fault Tree Analysis," Institute of Complexity Science and Qingdao Hisense & Hitachi Air-conditional System Limited Company, vol. 25 No. 2 Apr. 2007, 4 pages.

Duan Zhou, "The Application of Bayesian Networks in System Reliability," A thesis presented in partial fulfillment of the requirements for the degree Master of Science, Arizona State University, 69 pages, Dec. 2014.

Wikipedia, "Fault Tree Analysis," downloaded Jul. 16, 2020, 11 pages.

https://www.weibull.com/hotwire/issue63/relbasics63.htm, Minimal Cut Sets, HBM Prenscia Inc., downloaded Jul. 20, 2020, 3 pages.

* cited by examiner

SYSTEMS AND METHODS FOR FAILURE DIAGNOSIS USING FAULT TREE

BACKGROUND

Failure, fault, or malfunction of a machine or system is common in certain industries. System administrators or maintenance personnel often need to quickly diagnose the cause of a machine or system failure in order to take timely corrective actions. In addition, for purposes of preventive maintenance and prognostic health management, it is also important to identify the "weakest links" that could potentially cause the machine or system to fail. However, the more complex the machine or system is, the more difficult it is to diagnose or identify the failure cause, especially under time pressure.

Another challenge is that the failure cause of the machine or system may not remain constant because its operational conditions may change over time. For example, the reliability parameters of some components of the machine or system may vary due to data update, material aging, component modification, maintenance, human usage, or other factors. As a result, a previously high-reliability component may degrade to a low-reliability one when service time elapses.

On the other hand, the reliability of a degraded component may rise to a higher level after proper maintenance, refurbishment, or modification. Thus, there remains a need for an improved system and method for intelligent failure diagnosis that is simple, fast, and can keep pace with the changing operational conditions of a machine or system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain embodiments of the disclosure concern a computer-implemented method. The method can include receiving a fault tree comprising a node representing a top event, a plurality of nodes representing respective basic events, and one or more logic gates connecting the plurality of nodes representing the respective basic events to the node representing the top event; obtaining reliability parameters corresponding to the respective basic events; calculating fault tree importance measures corresponding to the respective basic events; calculating failure impact factors of the top event corresponding to the respective basic events based on the reliability parameters and the fault tree importance measures; ranking the respective basic events based on the failure impact factors of the top event; and identifying a most significant contributor to the top event. The most significant contributor is a basic event having the highest failure cause probability of the top event.

In certain embodiments, the computer-implemented method can further include updating one or more of the reliability parameters.

In certain embodiments, the computer-implemented method can further include re-calculating the fault tree importance measures corresponding to the respective basic events and re-calculating the failure impact factors of the top event upon updating the one or more of the reliability parameters.

In certain embodiments, the computer-implemented method can further include re-ranking the basic events and updating the most significant contributor to the top event upon updating the one or more of the reliability parameters.

In certain embodiments, updating one or more of the reliability parameters can include measuring failure probabilities of the respective basic events using a plurality of sensors connected to an internet-of-things (IoT) cloud service, and transmitting the measured failure probabilities to a failure analysis and diagnostic engine through a communication network.

In certain embodiments, measuring failure probabilities of the respective basic event can include registering the plurality of sensors with an IoT device manager of the IoT cloud service. The IoT device manager can establish credentials for the plurality of sensors to access the IoT cloud service, receive data stream measured by the plurality of sensors, and define communication protocols between the plurality of sensors and the IoT cloud service.

In certain embodiments, transmitting the measured failure probabilities to the failure analysis and diagnostic engine can include processing data stream measured by the plurality of sensors by an IoT message processing unit of the IoT cloud service to calculate the measured failure probabilities. The IoT message processing unit can further define communication protocols between the IoT cloud service and the failure analysis and diagnostic engine.

In certain embodiments, the computer-implemented method can further include generating an alert and displaying the most significant contributor to the top event on a graphical user interface.

In certain embodiments, the fault tree importance measures can include risk achievement worth corresponding to a basic event. The risk achievement worth can be calculated as a ratio of (i) a probability of the top event conditioned on setting a probability of the basic event to one, and (ii) a probability of the top event. The failure impact factors of the top event can be products of the corresponding reliability parameters and the corresponding fault tree importance measures.

In certain embodiments, the computer-implemented method can further include decomposing the fault tree into one or more minimal cut sets and calculating probabilities corresponding to the one or more minimal cut sets. The probability of the top event can be calculated based on probabilities corresponding to the one or more minimal cut sets.

Certain embodiments of the disclosure also concern a system including one or more processors, and memory coupled to the one or more processors comprising instructions causing the one or more processors to perform a method. The method can include receiving a fault tree comprising a node representing a top event, a plurality of nodes representing respective basic events, and one or more logic gates connecting the plurality of nodes representing the respective basic events to the node representing the top event; obtaining reliability parameters corresponding to the respective basic events; calculating fault tree importance measures corresponding to the respective basic events; calculating failure impact factors of the top event corresponding to the respective basic events based on the reliability parameters and the fault tree importance measures; ranking the respective basic events based on the failure impact factors of the top event; and identifying a most significant contributor to the top event, wherein the most significant contributor is a basic event having the highest failure cause probability of the top event.

In certain embodiments, the method can be further configured to update one or more of the reliability parameters.

In certain embodiments, the method can be further configured to re-calculate fault tree importance measures corresponding to the respective basic events and re-calculate failure impact factors of the top event upon updating the one or more of the reliability parameters.

In certain embodiments, the method can be further configured to re-rank the respective basic events and update the most significant contributor of the top event upon updating the one or more of the reliability parameters.

In certain embodiments, the system can further include a plurality of sensors connected to an internet-of-things (IoT) cloud service. Updating one or more of the reliability parameters can include measuring failure probabilities of the respective basic events using the plurality of sensors, and transmitting the measured failure probabilities to a failure analysis and diagnostic engine through a communication network.

In certain embodiments, measuring failure probabilities of the basic event can include registering the plurality of sensors with an IoT device manager of the IoT cloud service. The IoT device manager can establish credentials for the plurality of sensors to access the IoT cloud service, receive data stream measured by the plurality of sensors, and define communication protocols between the plurality of sensors and the IoT cloud service.

In certain embodiments, transmitting the measured failure probabilities to the failure analysis and diagnostic engine can include processing data stream measured by the plurality of sensors by an IoT message processing unit of the IoT cloud service to calculate the measured failure probabilities. The IoT message processing unit can further define communication protocols between the IoT cloud service and the failure analysis and diagnostic engine.

In certain embodiments, the system can further include a graphical user interface configured to generate an alert and display the most significant contributor to the top event.

In certain embodiments, the fault tree importance measures can include risk achievement worth corresponding to a basic event. The risk achievement worth can be calculated as a ratio of (i) a probability of the top event conditioned on setting a probability of the basic event to one, and (ii) a probability of the top event. The failure impact factors of the top event can be products of the corresponding reliability parameters and the corresponding fault tree importance measures.

Certain embodiments of the disclosure further concern one or more computer-readable media having encoded thereon computer-executable instructions causing one or more processors to perform a method. The method can include receiving a fault tree comprising a node representing a top event, a plurality of nodes representing respective basic events, and one or more logic gates connecting the plurality of nodes representing the respective basic events to the node representing the top event; obtaining reliability parameters corresponding to the respective basic events; calculating fault tree importance measures corresponding to the respective basic events; calculating failure impact factors of the top event corresponding to the respective basic events, wherein the failure impact factors of the top event are products of the corresponding reliability parameters and the corresponding fault tree importance measures; ranking the respective basic events based on the failure impact factors of the top event; identifying a most significant contributor to the top event, wherein the most significant contributor is a basic event having the highest failure cause probability of the top event; updating one or more of the reliability parameters; re-calculating the fault tree importance measures corresponding to the respective basic events and re-calculating the failure impact factors of the top event upon updating the one or more of the reliability parameters; re-ranking the respective basic events and updating the most significant contributor to the top event upon updating the one or more of the reliability parameters; and updating one or more of the reliability parameters comprises measuring failure probabilities of the respective basic events using a plurality of sensors connected to an internet-of-things (IoT) cloud service and transmitting the measured failure probabilities to a failure analysis and diagnostic engine through a communication network.

The foregoing and other objects, features, and advantages will become more apparent from the following detailed description, which proceeds with reference to the accompanying figures.

DETAILED DESCRIPTION

Example 1

Example Overview of the Overall System for Intelligent Failure Diagnosis

Figure 1:
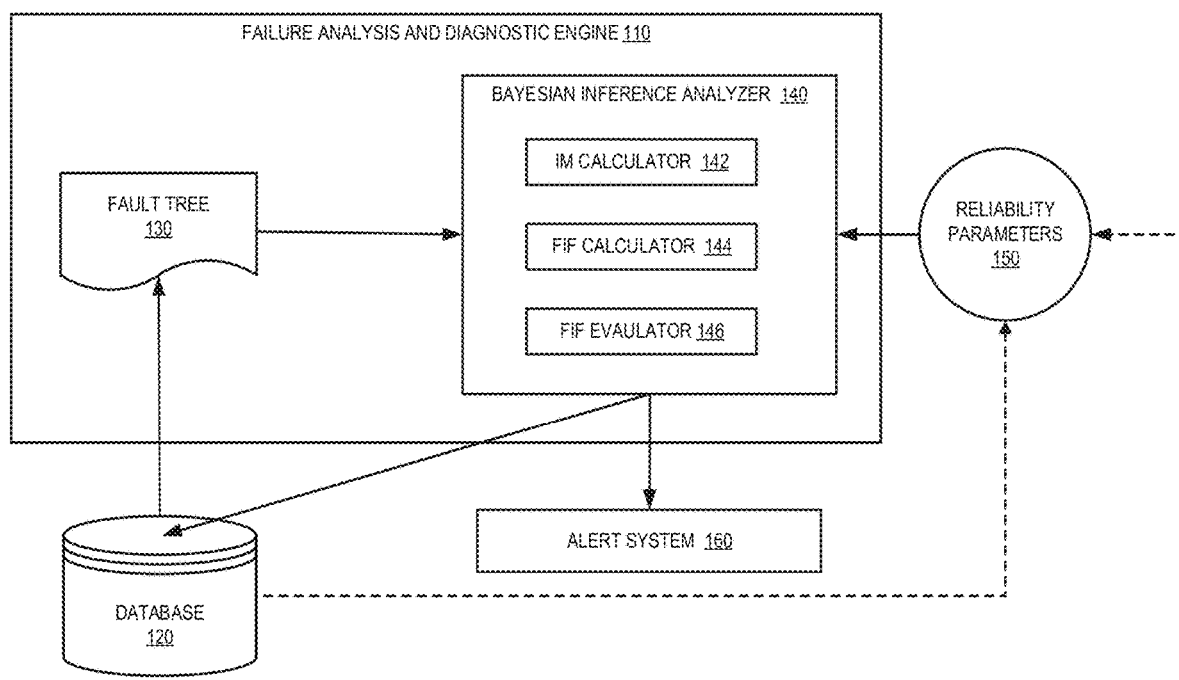
FIG. 1 is a block diagram of an example overall system implementing intelligent failure diagnosis, including a failure analysis and diagnostic engine.

FIG. 1 is a block diagram of an example overall system 100 that implements the technologies described herein.

As shown, the overall system 100 can include a failure analysis and diagnostic engine 110. The failure analysis and diagnostic engine 110 can be in communication with a database 120 which stores data pertinent to a machine or system (hereinafter referred to as the "target system"), which is the subject of the failure cause analysis and diagnosis.

In one embodiment, the database 120 can provide a fault tree of the target system as an input to a Bayesian inference analyzer 140 of the failure analysis and diagnostic engine 110. As described more fully below, the fault tree is a hierarchical structure that includes a node representing a top event, a plurality of nodes representing respective basic events, and one or more logic gates connecting the plurality of nodes representing the respective basic events to the node representing the top event. The top event typically represents failure of the target system. The basic events typically represent some component failures of the target system, wherein such component failures are the lowest level of identifiable causes of the failure of the target system. The logic gates, such as OR or AND gates, give the logical relationship between the top event and the basic events. In other words, the fault tree uses Boolean logic to connect a series of basic events to the top event and provides a graphical representation to identify the basic events that can cause the top event to occur.

The Bayesian inference analyzer 140 can also receive input of reliability parameters 150 corresponding to the basic events. In some embodiments, the reliability parameters 150 can be obtained from the database 120. In other embodiments, the reliability parameters 150 can be sent from other sources, such as the Internet-of-things (IoT) cloud service, as described below. In a particular embodiment, the reliability parameters 150 can be failure probabilities of respective components of the target system.

The Bayesian inference analyzer 140 can implement a method of performing Bayesian inference based on the fault tree 130 and the reliability parameters 150. As described more fully below, the Bayesian inference can be performed by a series of operations. For example, the method can calculate a fault tree importance measure (IM) by an IM calculator 142, calculate a failure impact factor (FIF) by a FIF calculator 144, and rank the calculated FIF values by a FIF evaluator 146 to determine a most significant contributor (MSC) of the top event.

In some embodiments, the outcome of the failure analysis and diagnosis, including the ranked FIF values and the determined MSC of the top event, can be sent to an alert system 160, which can display or notify the most likely root cause of an occurred top event (i.e., failure of the target system), or alert a user of the target system on potential occurrence of basic events (i.e., failure of components) that may trigger the occurrence of the top event.

In practice, the systems and sub-systems shown herein, such as systems 100 and the failure analysis and diagnostic engine 110 can vary in complexity, with additional functionality, more complex components, and the like. For example, there can be additional functionality within the Bayesian inference analyzer 140. Although the example shows a single fault tree 130, in practice, a plurality of fault trees corresponding to multiple target systems can be processed, based on the same technology described herein. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the software applications, the database, the fault tree, the reliability parameters, the calculated metrics, and the like can be stored in one or more computer-readable storage media or computer-readable storage devices. The technologies described herein can be generic to the specifics of operating systems or hardware and can be applied in any variety of environments to take advantage of the described features.

Example 2

Example System Supporting Dynamic Failure Diagnosis

Figure 2:
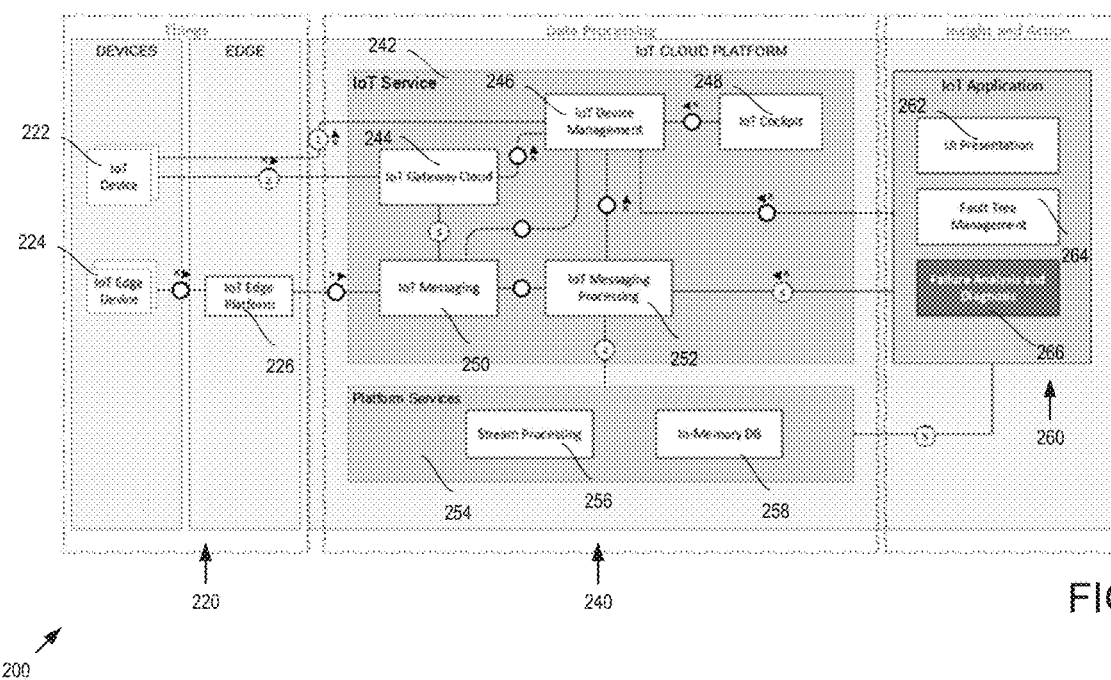
FIG. 2 is a block diagram of an example system comprising the failure analysis and diagnostic engine depicted in FIG. 1, according to one embodiment.

FIG. 2 is a block diagram of an example system utilizing 200 the IoT technology to support dynamic failure diagnosis of a target system 220.

As shown, the target system 220 can be connected to an IoT cloud platform 240, which can be further connected to an IoT application 260.

The target system 220 can include a plurality of IoT devices 222 (also referred to as "IoT sensors") that are configured to measure performance or other operational conditions of various components of the target system 220, wherein failure or abnormal condition of the components could potentially cause failure of the target system 220. In some embodiments, the target system 220 can also include one or more IoT edge devices 224. The IoT edge devices 224 enable data collected by the IoT sensors to be processed at the local devices, instead of the IoT cloud service 240. By bringing cloud computing capabilities to the edge, IoT edge computing can process data faster, preventing delays, security breaches and other concerns.

In some embodiments, the IoT edge devices 224 can be connected to an IoT edge platform 226 (e.g., Microsoft Azure IoT Edge, SAP Edge Services, etc.), which is deployed at the edge and serves as a gateway that bring the IoT devices 222 and IoT edge devices 224 online. In some embodiments, the IoT devices 222 can be connected to an IoT cloud gateway 244 located at the IoT cloud service 242. The IoT cloud gateway 244 and/or the IoT edge platform 226 can provide adapters for network convergence and syntactic protocol normalization. They can also act as a virtual gateway that brings IoT devices 222 online, and be responsible for collecting data from the IoT devices 222 and sending commands to the IoT devices 222 on behalf of other modules.

As shown, the IoT cloud platform 240 can provide an IoT cloud service 242 and other platform services 254. In one example embodiment, the IoT cloud service 242 can include the IoT cloud gateway 244, an IoT device manager 246, an IoT cockpit 248, an IoT messenger 250, and an IoT message processing unit 252.

The IoT device manager 246 can offer an application programming interface (API) that provides functionality for the management of the lifecycle of IoT devices 222. For example, the IoT device manager 246 can register the IoT devices 222 to enable them to connect to the IoT cloud service 242. Specifically, the IoT device manager 246 can establish credentials for the IoT devices 222 to give them access to the IoT cloud service 242. The IoT device manager 246 can also define the message format for measures and commands. For example, through the IoT gateway cloud manager 244, the data stream measured and sent by the IoT devices 222 or IoT edge devices 224 can be received by the IoT device manager 246.

In addition, the IoT device manager 246 can define communication protocols between the IoT devices 222 and the IoT cloud service 242. In one example embodiment, the IoT device manager 246 can specify the sampling rate of the IoT devices 222, the frequency and/or format of the data stream transmitted from the IoT devices 222 to the IoT cloud service 242, etc. For example, data transmission from the IoT devices 222 to the IoT cloud service 242 can be conducted in real-time (e.g., data transmission frequency is the same as the sampling rate), periodically (e.g., every millisecond, second, minute, etc.), or on-demand (e.g., data transmission is triggered upon a user's demand).

The IoT messenger 250 can handle all incoming data streams and messages sent from the IoT devices 222 or the IoT edge devices 224. The IoT message processing unit 252 can define how the received data streams and messages should be processed. For example, the IoT message processing unit 252 can calculate or estimate the failure probabilities of the basic events, i.e., the likelihood of component failures as measured by the corresponding IoT devices 222. As described herein, the failure probabilities of the basic events can also be referred to as the reliability parameters 150 noted above.

The IoT message processing unit 252 can also define communication protocols between the IoT cloud service 242 and the failure analysis and diagnostic engine 266 residing in the IoT application 260. For example, the IoT message processing unit 252 can specify how frequent the calculated failure probabilities of the basic events should be sent to the IoT application 260. Transmission of the failure probabilities of the basic events to the IoT application 260 can invoke the failure analysis and diagnostic engine 266 to recalculate, and dynamically update its failure diagnosis results based on the latest failure probabilities of the basic events.

In one example embodiment, the IoT message processing unit 252 can control the data transmission frequency between the IoT cloud platform 240 and the IoT application 260. For example, failure probabilities of the basic events can be transmitted from the IoT cloud platform 240 to the IoT application 260 in real-time (e.g., data transmission occurs in synchronization with the incoming data stream from the IoT devices), periodically (e.g., every millisecond, second, minute, etc.), or on-demand (e.g., data transmission is triggered upon a user's demand).

In addition, the IoT message processing unit 252 can interact with the platform services 254, which supports real-time stream processing 256 and an in-memory database 258. For example, the calculated failure probability of the basic events and some relevant device messages can be stored in the database 258 or forwarded to streaming to an HTTP endpoint. A fault tree depicting the logical relationship between the top event and the basic events associated with the target system 220 can also be stored in the database 258.

The IoT cockpit 248 can serve as an interface for users to interact with the IoT cloud service 242 and provide access to user management, device management, platform administration, resource visibility allocation, and data visualization. For example, the IoT cockpit 248 can provide a user interface to the IoT device manager 246, thus allowing a user to register new IoT devices 222, to define the schema of messages (e.g., device types and message types) they can send and receive, etc.

The IoT Application 260 receives the processed data from the IoT cloud platform 240 and invokes failure diagnosis method described herein.

In the depicted example embodiment, the IoT Application 260 includes a user-interface (UI) presentation module 262, a fault tree management module 264, and a failure analysis and diagnosis engine 266. The fault tree management module 264 can retrieve the fault tree associated with the target system 220 from the database 258, and update reliability parameters associated with the components of the target system (e.g., the failure probabilities of the basic events) when necessary. The failure analysis and diagnosis engine 266, which can have the same structure as the failure analysis and diagnosis engine 110 depicted in FIG. 1, embeds software code that, when executed, can perform Bayesian inferential analysis based on the fault tree to identify which basic event is the most significant contributor to a top event. The output of the fault analysis and diagnosis module 266 can be sent to and displayed on the UI presentation module 262. In some embodiments, the UI presentation module 262 can function as or be connected to an alert system similar to 160 described above, i.e., to notify the most likely cause of an occurred top event or generate an alert on potential occurrence of basic events that may trigger the occurrence of the top event so that corrective or preventative actions can be timely taken.

The system 200 described herein allows the use of a broad variety of IoT services and protocols to manage the lifecycle of the target system 220. Connecting the IoT devices 222 to IoT cloud platform provides scalable ingestion of sensor data as well as IoT device management and connectivity. These data can be processed and aggregated to dynamically assess the failure risk of the target system 220 based on dynamic change of the operational status or risk profiles of various components of the target system 220.

Example 3

Example Overall Method of Failure Diagnosis Using Fault Tree

Figure 3:
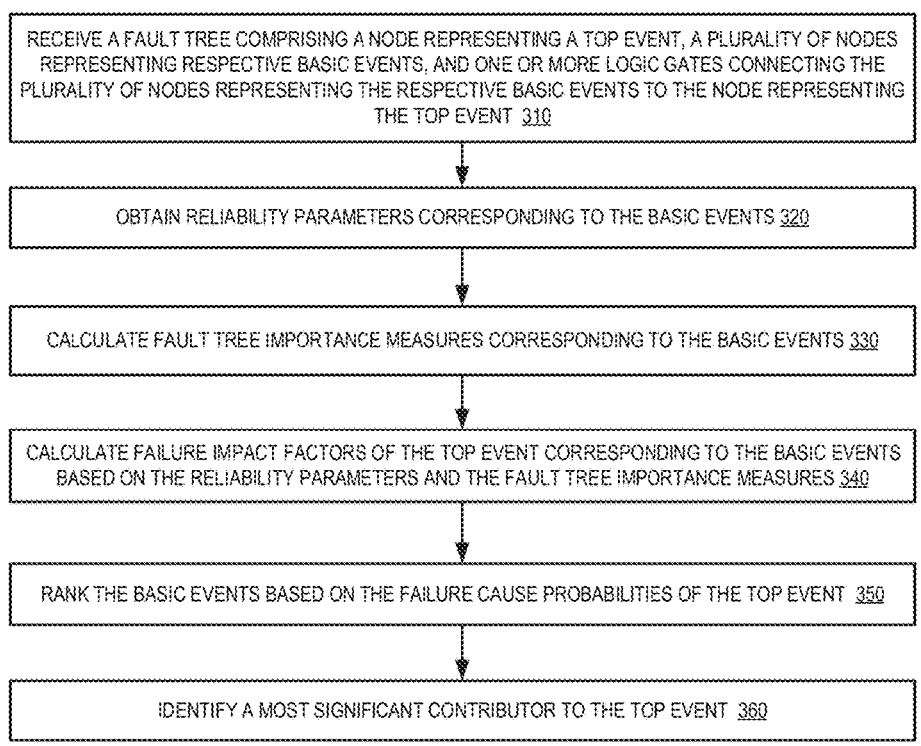
FIG. 3 is a flowchart illustrating an example overall method of failure diagnosis based on a fault tree.

FIG. 3 is a flowchart illustrating an example overall method 300 of performing failure diagnosis using fault tree, by the system of FIG. 1.

At 310, the failure analysis and diagnostic engine 100 can receive a fault tree that includes a node representing a top event, a plurality of nodes representing respective basic events, and one or more logic gates connecting the plurality of nodes representing the respective basic events to the node representing the top event. At 320, the failure analysis and diagnostic engine 100 can receive reliability parameters 150 corresponding to the basic events. As noted above, the reliability parameters 150 can be obtained from a database 258, or sent from other sources, such as the IoT cloud service 242. At 330, the IM calculator 142 can calculate the fault tree importance measures corresponding to the basic events. At 340, the FIF calculator 144 can calculate failure impact factors of the top event corresponding to the basic events based on the reliability parameters and the fault tree importance measures. At 350, the FIF evaluator 146 can rank the basic events based on the failure impact factors of the top event. Then at 360, the FIF evaluator 146 can identify a most significant contributor (MSC) to the top event.

Figure 4:
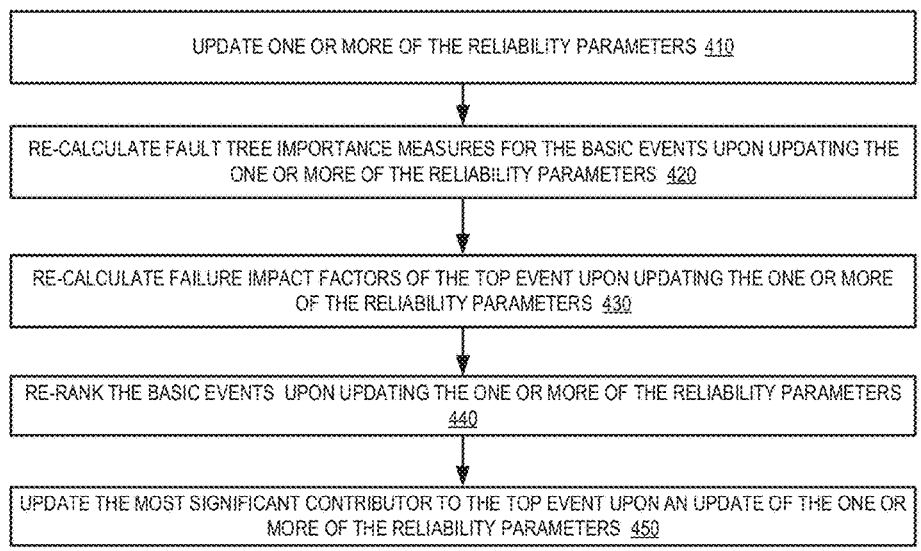
FIG. 4 is a flowchart illustrating an example method of dynamically performing fault diagnosis after the initial fault diagnosis depicted in FIG. 3.

FIG. 4 is a flowchart illustrating an example method of dynamically performing fault diagnosis after the initial fault diagnosis depicted in FIG. 3.

At 410, one or more of the reliability parameters 150 can be updated. As noted above, depending on the transmission protocol between the IoT cloud platform 240 and the IoT application 260, the reliability parameters 150 can be updated in real-time, periodically, or on-demand. At 420, the IM calculator 142 can re-calculate the fault tree importance measures corresponding to the basic events upon an update of the one or more reliability parameters. At 430, the FIF calculator 144 can re-calculate the failure impact factors of the top event upon an update of the one or more of the reliability parameters. At 440, the FIF evaluator 146 can re-rank the basic events. Then at 450, the FIF evaluator 146 can update the MSC to the top event upon an update of the one or more of the reliability parameters.

The methods 300, 400 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4

Example Fault Tree

Figure 5:
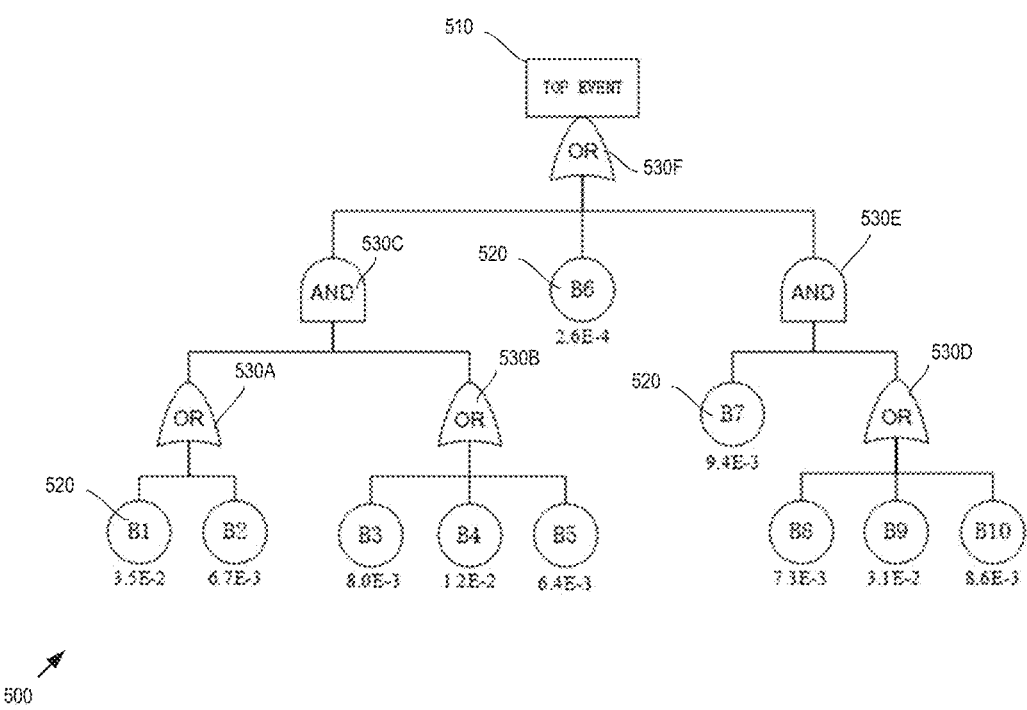
FIG. 5 is a diagram illustrating an example embodiment of a fault tree which includes a node representing a top event and a plurality of nodes representing respective basic events that are associated with respective reliability parameters.

FIG. 5 shows an example fault tree 500 corresponding to a target system that can be analyzed for failure diagnosis.

Generally, a fault tree is a top-down logical diagram or hierarchical structure that displays the interrelationship between a top event (e.g., target system failure) and its likely causes, i.e., basic events (e.g., component failures). As shown in FIG. 5, the fault tree 500 includes a node 510 representing a top event, a plurality of nodes 520 representing respective basic events (10 basic events are shown in this example: B1, B2, . . . , B10), and one or more logic gates 530A-F (collectively 530) connecting the plurality of nodes 520 representing the respective basic events to the node 510 representing the top event. For example, the nodes representing the basic events B1 and B2 are connected by an OR gate 530A, the nodes representing the basic events B3, B4, and B5 are connected by another OR gate 530B, and the output of the OR gate 530A and the output of the OR gate 530B are connected by an AND gate 530C. The output of logic gates 530 can be termed as respective intermediate events, except for the OR gate 530F whose output is the top event 510. While only AND and OR gates are shown in the depicted example, other logic gates (e.g., exclusive OR gate, priority AND gate, inhibit gate, etc.) may also be included in the fault tree.

In addition, each basic event shown in FIG. 5 is associated with a failure probability (or reliability parameter). For example, the failure probabilities associated with B1-B10 are 3.5E-2, 6.7E-3, 8.0E-3, 1.2E-2, 6.4E-3, 2.6E-4, 9.4E-3, 7.3E-3, 3.1E-2, and 8.6E-3, respectively.

Example 5

Example Quantification of Top Event Probability

The probability of any intermediate event and the top event in a fault tree can be calculated using Boolean algebra. For example, the probability of the intermediate event corresponding to the output of OR gate 530A can be calculated as $P(B1 \cup B2)=P(B1)+P(B2)-P(B1 \cap B2)$. Since failure probabilities of basic events tend to be small, $P(B1 \cap B2)$ usually becomes a very small error term, and the output of an OR gate 530A may be approximated by using an assumption that B1 and B2 are mutually exclusive events, i.e., $P(B1 \cap B2) \approx 0$. Thus, $P(B1 \cup B2) \approx P(B1)+P(B2)$. The probability of the intermediate event corresponding to the output of OR gate 530B, i.e., $P(B3 \cup B4 \cup B5)$, can be similarly calculated. Next, the probability of the intermediate event corresponding to the output of AND gate 530C can be calculated as $P((B1 \cup B2) \cap (B3 \cup B4 \cup B5))=P(B1 \cup B2) \cdot P(B3 \cup B4 \cup B5)$, assuming the two intermediate events (i.e., the output of OR gate 530A and the output of AND gate 530C) are independent events.

As described herein, the probability of the top event can be calculated based on minimal cut set analysis. Specifically, the fault tree 500 can be decomposed into one or more minimal cut sets. A cut set is a combination of basic events that can cause the top event. If no event can be removed from a cut set without causing the top event, then such cut set is called a minimal cut set. Minimal cut sets can reveal the structural vulnerability of a system. Generally, the longer a minimal cut set is, the less vulnerable the top event is to that combination of basic events. On the other hand, a larger number of cut sets may indicate higher vulnerability of the system. Various methods have been developed to determine the minimal cut sets based on a fault tree, and these methods can be used in conjunction with the technologies described herein. In the depicted example, the fault tree 500 can be decomposed into 10 minimal cut sets: {B1, B3}, {B1, B4}, {B1, B5}, {B2, B3}, {B2, B4}, {B2, B5}, {B6}, {B7, B8}, {B7, B9}, and {B7, B10}.

Top event occurs if one or more of the minimal cut sets occur. If all the minimal cuts are independent to each other, then the probability of top event (Q) can be calculated based on minimal cut sets' probabilities. Mathematically, the top event probability Q can be calculated by:

$$Q = 1 - \Pi_{j=1}^{N}(1-\tilde{Q}_j)$$

where N is the number of minimal cut sets, $\tilde{Q}_i$ is the failure probability of the j-th minimal cut set $(MCS_j)$ and is calculated by:

$$\tilde{Q}_j = \Sigma_{i \in MCS_j} p_i$$

where $p_i$ is the probability of the i-th basic event in the minimal cut set $MCS_j$. In some embodiments, when the number of minimal cut set is very large, a cut-off procedure may be needed to truncate some minimal cut sets that are associated with extremely low probabilities, and a first-order approximation of quantification may be applied in order to reduce the complexity of computation. Various methods have been developed to calculate the top event probability with or without truncation of the minimal cut sets, and these methods can be used in conjunction with the technologies described herein.

Example 6

Example Importance Measures

As a preliminary step of Bayesian inference, the importance of each basic event of the fault tree can be quantified.

There are several different importance measures that can evaluate the importance of basic events from different perspectives.

For example, the risk achievement worth (RAW) can be defined as:

$$RAW_i = \frac{Q_{(i=1)}}{Q}$$

Here, the symbol $Q_{(i=1)}$ stands for the probability of the top event on the condition that the failure probability of the i-th basic event is set to be 1, i.e., the i-th basic event is assumed to certainly happen.

In another example, the risk reduction worth (RRW) can be defined as:

$$RRW_i = \frac{Q}{Q_{(i=1)}}$$

Here, the symbol $Q_{(i=0)}$ stands for the probability of the top event on the condition that the failure probability of the i-th basic event is set to be 0, i.e., the i-th basic event is assumed to certainly not happen.

In yet another example, the Fussell-Vesely (FV) importance measure can be defined as:

$$FV_i = \frac{Q_{(i \in MCS)}}{Q}$$

Here, the symbol $Q_{(i \in MCS)}$ stands for the probability of the top event on the condition that the minimal cut set (MCS) includes the i-th basic event.

Other importance measures, such as the Birnhaum reliability measure, Lambert criticality importance measure, Barlow-Proschan importance measure, Monte-Carlo variance importance measure, etc., as known or to be developed in the field, can also be used in conjunction with the technologies described herein.

Example 7

Example Method of Bayesian Inference

An example method of Bayesian inference based on the risk achievement worth (RAW) is described below.

The relationship between the probability of top event and the probabilities of basic events can be described by the Bayesian formula:

$$P(B_i | Q) = \frac{P(Q | B_i)P(B_i)}{\sum_{i=1}^{n} P(Q | B_i)P(B_i)}$$

Substituting the definition of RAW, the above formula can be rewritten as:

$$P(B_i | Q) = \frac{Q_{(i=1)} \cdot P(B_i)}{Q} = RAW_i \cdot P(B_i)$$

Here, $B_i$ symbolizes the i-th basic event in the fault tree whose failure probability $P(B_i)$ is already known, i.e., $P(B_i)$ can be measured or estimated reliability parameters that are sent from the IoT cloud platform to the failure analysis and diagnosis engine (see e.g., FIG. 1 and FIG. 2). As described above, $P(B_i)$ can also be termed reliability parameter corresponding to the basic event $B_i$.

The probability $P(Q|B_i)$ is the top event probability on the condition that the i-th basic event occur. It can be calculated as $Q_{(i=1)}$, i.e., by setting the failure probability of the i-th basic event to 1. The top event probability Q, which is approximately contributed by each basic event, as denoted by the summation ("Σ") of all $P(Q|B_i)$, can be calculated based on minimal cut set analysis described above.

The probability $P(B_i|Q)$ is the conditional probability of $B_i$ under the condition that the top event occurs and is also referred to as "failure cause probability" in the graphical user interface shown in FIGS. 7-8 below. The above formula provides that, assuming the top event happens, the probability that its cause is $B_i$ equals the proportion of $B_i$ contribution to the total probability of the top event.

As described herein, $P(B_i|Q)$ (or "failure cause probability") is an example failure impact factor (FIF) which can be ranked and evaluated to determine the most significant contributor (MSC) to the top event, as exemplified in TABLES I-II and FIGS. 7-8 below. Generally, the FIF of a basic event is a function of both the reliability parameter and the fault tree importance measure corresponding to the basic event. In this specific example, as the above formula indicates, $P(B_i|Q)$ is the product of the failure probability of the respective basic event $P(B_i)$ and its corresponding importance measure $RAW_i$.

Technically, the Bayesian formula is based on ideal assumptions that all the basic events are mutually exclusive. In fault tree analysis, it is often assumed that the basic events are independent of each other and the first-order approximation can be applied. In real-world applications, basic events are rarely independent or mutually exclusive. However, or simplification of calculation, some complicated cases may be excluded from consideration if they are trivial and some approximation assumptions can be applied, especially in engineering practice. For example, the probability of the combination of more than one basic event can be deemed to be too trivial to be worth consideration (also known as second and third order approximations), especially if their failure probabilities are very small.

Example 8

Example Method of Determining MSC to the Top Event

After calculating the failure impact factor (FIF) corresponding to each basic event, such calculated failure impact factors can be evaluated (e.g., by the FIF evaluator 146) to determine the most significant contributor (MSC) to the top event.

Specifically, using the example described above, after the probability $P(B_i|Q)$ corresponding to each basic event is calculated, all the basic events can be ranked in terms of their respectively calculated $P(B_i|Q)$, i.e., the inferred probability of causing the top event to happen.

In one example embodiment, the basic event that corresponds to the highest $P(B_i|Q)$ is identified as the most probable failure cause or MSC of the top event.

In another embodiments, a predefined number (e.g., K) of basic events correspond to the top K positions on the ranked list are identified as the most probable failure causes of the top event.

As an example, Table I below lists the reliability parameters ($P(B_i)$), the calculated importance measures ($RAW_i$), and the ranked FIF values (i.e., the product of $P(B_i)$ and $RAW_i$) corresponding to the basic events B1-B10. As shown, the FIF value corresponding to the basic event B1 is on the top of the ranked list. Thus, B1 is deemed to be the MSC to the top event in this example.

TABLE I

|     | $FIF_i$   | $P(B_i)$  | $RAW_i$  |
|-----|-----------|-----------|----------|
| B1  | 5.28E-01  | 3.50E-02  | 1.51E+01 |
| B4  | 2.84E-01  | 1.20E-02  | 2.37E+01 |
| B7  | 2.51E-01  | 9.40E-03  | 2.68E+01 |
| B3  | 1.89E-01  | 8.00E-03  | 2.37E+01 |
| B9  | 1.87E-01  | 3.10E-02  | 6.03E+00 |
| B5  | 1.51E-01  | 6.40E-03  | 2.37E+01 |
| B6  | 1.46E-01  | 2.60E-04  | 5.62E+02 |
| B2  | 1.01E-01  | 6.70E-03  | 1.51E+01 |
| B10 | 5.18E-02  | 8.60E-03  | 6.03E+00 |
| B8  | 4.40E-02  | 7.30E-03  | 6.03E+00 |

Example 9

Example Variants of Failure Impact Factors

While the conditional probability $P(B_i|Q)$ (i.e., the product of $P(B_i)$ and $RAW_i$) is selected as an example FIF, other metrics can be used to define FIF.

In one example embodiment, the FIF can be defined as a general function of $P(B_i)$ and $RAW_i$, provided that both $P(B_i)$ and $RAW_i$ are positively correlated with FIF. For example, FIF can be defined as:

$$FIF_i = RAW_i^m \cdot P(B_i)^n$$

where m and n are positive numbers (integer or non-integer values) that give respective weights to $RAW_i$ and $P(B_i)$. In another example, FIF can be defined as:

$$FIF_i = w_1 \cdot RAW_i + w_2 \cdot P(B_i)$$

where $w_1$ and $w_2$ are respective weighting factors for $RAW_i$ and $P(B_i)$.

In another example embodiment, the FIF can be defined as a general function of $P(B_i)$ and an importance measure other than RAW. For example, FIF can be defined as a weighted product (or weighted sum) of $P(B_i)$ and $RRW_i$, similar to the generic functions described above (e.g., by replacing $RAW_i$ with $RRW_i$). Thus, increase in $P(B_i)$ or $RRW_i$ can cause increase in $FIF_i$. In another example, FIF can be defined as a weighted product (or weighted sum) of $P(B_i)$ and $FV_i$ similar to the generic functions described above (e.g., by replacing $RAW_i$ with $FV_i$). Thus, higher $P(B_i)$ or $FV_i$ can result in higher $FIF_i$. In other words, the FIF can be defined as a generic function of both $P(B_i)$ and an importance measure so long as increasing either $P(B_i)$ or the importance measure can cause corresponding increase in the FIF. On the other hand, if the chosen importance measure (denoted as IM) is inversely correlated to RAW, then its reverse form (e.g., 1/IM or 1-IM) can be used to replace RAW in the generic functions described above.

Similarly, after calculating respective FIF corresponding to each basic event, such calculated FIF values can be ranked and the basic event corresponding to the highest FIF can be determined as the MSC to the top event.

Example 10

Example Update of Fault Tree and Dynamic Failure Diagnosis

As described above in connection with FIG. 2, the failure cause of the target system 220 may not remain constant because the operational status or risk profiles of its components may change over time. By connecting the failure analysis and diagnosis engine 266 with the IoT cloud platform 240, changes of the reliability parameters of those components over time can be measured by IoT devices 222, routed through the IoT messenger 250 and processed by the IoT message processing unit 252, and fed to the failure cause of the target system 220. As a result, dynamic risk assessment and failure diagnosis of the target system can be achieved.

Figure 6:
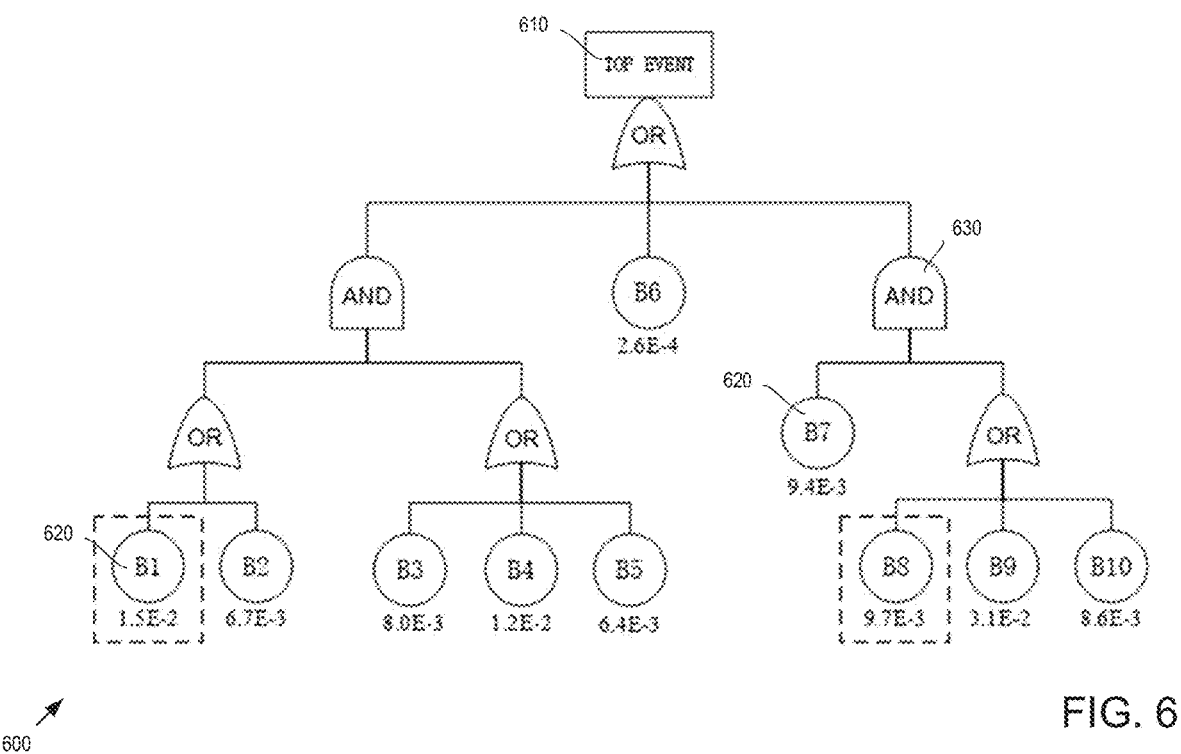
FIG. 6 is a diagram illustrating the same fault tree depicted in FIG. 5, except that the reliability parameters associated with some basic events are changed.

As an example, FIG. 6 illustrates a fault tree 600 comprising a node 610 representing the top event, a plurality of nodes 620 representing respective basic events B1-B10, and a plural of logic gates 630 connecting the plurality of nodes 620 to the node 610. Clearly, the fault tree 600 has the same hierarchical structure as the fault tree 500 depicted in FIG. 5. On the other hand, while the failure probabilities associated with B2-B7 and B9-B10 in the fault tree 600 remain the same as those shown in the fault tree 500, the failure probability associated with B1 has decreased from 3.5E-2 to 1.5E-2 (e.g., due to positive maintenance of the corresponding component) and the failure probability associated with B8 has increased from 7.3E-3 to 9.7E03 (e.g., due to degradation of the corresponding component). As described above, depending on the communication protocols, update of the reliability parameters can be performed in real-time (e.g., as soon as the IoT devices detect changes of the operating condition of the corresponding components), periodically (e.g., based on a predefined transmission interval), or on-demand (e.g., based on a trigger elicited by a user).

As the method described with respect to FIG. 4, upon the update of the reliability parameters associated with B1 and B8, the importance measures (e.g., RAW) and failure impact factors (FIF) corresponding to respective basic events can be recalculated, as shown in Table II below. Then the calculated FIF values can be re-ranked to determine an updated most significant contributor (MSC) to the top event. As shown, after update of the reliability parameters corresponding to B1 and B8, the order of B1-B10 has changed. The basic event B7 is now top on the list and recognized as the most probable failure cause of the top event. In other words, although the reliability parameter of B7 remains unchanged, the proportion of each basic event's contribution is reshuffled. As a result, B7 can be automatically updated to be the MSC to the top event.

TABLE II

|     | $FIF_i$   | $P(B_i)$  | $RAW_i$  |
|-----|-----------|-----------|----------|
| B7  | 3.62E-01  | 9.40E-03  | 3.86E+01 |
| B1  | 3.14E-01  | 1.50E-02  | 2.10E+01 |
| B9  | 2.47E-01  | 3.10E-02  | 7.97E+00 |
| B4  | 2.09E-01  | 1.20E-02  | 1.74E+01 |
| B6  | 2.03E-01  | 2.60E-04  | 7.80E+02 |
| B2  | 1.40E-01  | 6.70E-03  | 2.10E+01 |
| B3  | 1.39E-01  | 8.00E-03  | 1.74E+01 |
| B5  | 1.11E-01  | 6.40E-03  | 1.74E+01 |
| B8  | 7.73E-02  | 9.70E-03  | 7.97E+00 |
| B10 | 6.85E-02  | 8.60E-03  | 7.97E+00 |

Example 11

Example Failure Diagnosis of Multiple Failure Modes

The technology described herein can also be used for failure diagnosis of a target system having multiple failure modes.

In some embodiments, a given basic event can be associated with more than one failure mode, that is, a component failure can cause the target system to fail in different ways (i.e., causing different top events). In such circumstances, each failure mode can be modeled into a respective fault tree comprising the basic event. In other words, if the target system has multiple failure modes, multiple fault trees with different top events corresponding to different failure modes can be modeled. Alternatively, multiple failure modes (and the corresponding fault trees) can be deemed to correspond to respective target systems.

Usually, dominant failure modes should be modeled properly into respective fault trees if a machine has more than one failure mode. In such situations, any of the failure modes, even competing failure modes, may happen due to specific conditions. If one particular failure mode is detected, the failure diagnosis method described above can be employed to identify the most likely cause underlying that failure mode. On the other hand, for ongoing failure risk assessment, if the reliability parameter of one basic event is updated (e.g., based on the IoT sensor measurement), then failure diagnosis can be triggered for all basic events. Thus, failure risk corresponding to different failure modes can be dynamically evaluated.

Example 12

Example Graphical User Interface of Failure Diagnosis

FIGS. 7-10 show example graphical user interfaces that can be implemented at the user-interface (UI) presentation module 262 in connection with the failure analysis and diagnosis engine 266.

Figure 7:
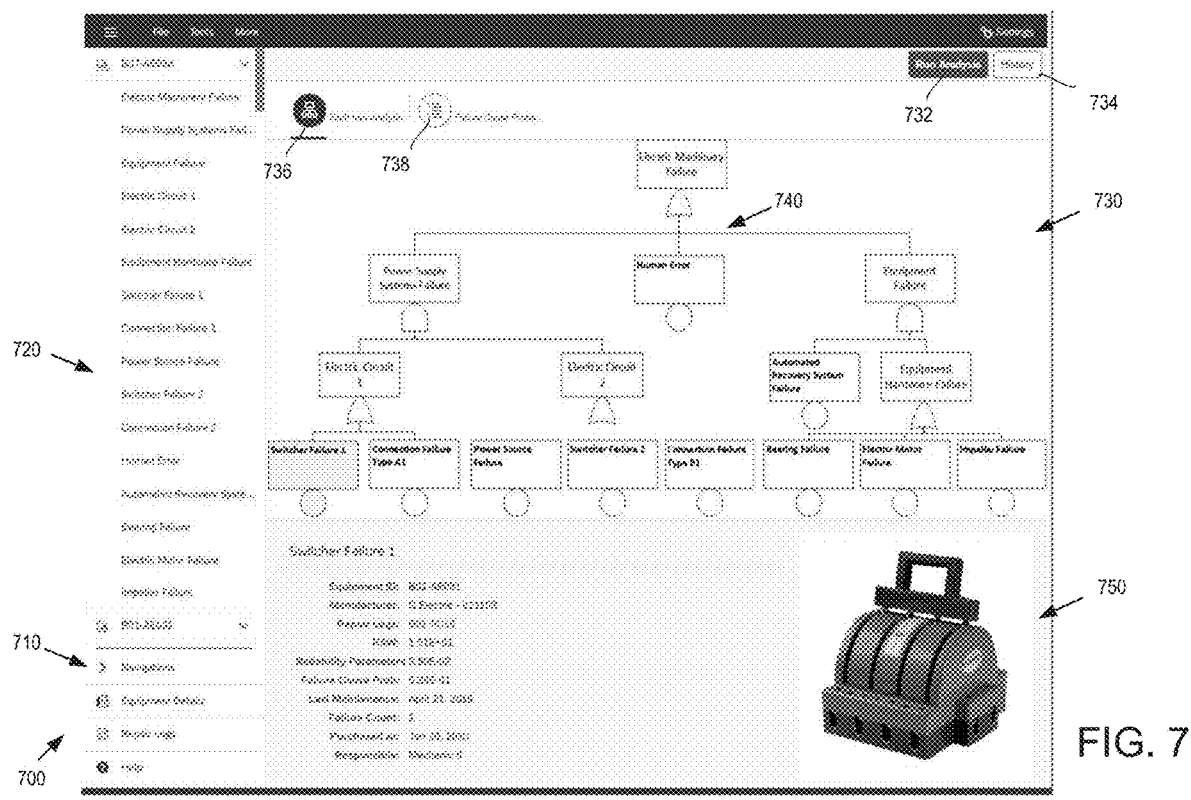
FIG. 7 is an example graphical user interface depicting a fault tree associated with a system and relevant information about a component of the system, wherein the fault tree has the same hierarchical structure as the fault tree depicted in FIG. 5.

Specifically, FIG. 7 shows an example graphical user interface 700 comprising a menu bar 710, a browser panel 720, a fault tree display window 730, and a component display window 750. In the depicted example, the menu bar 710 displays menu items of the IoT application 260 which implements the fault diagnosis method describe herein. For example, selection of the "navigations" menu item can cause the browser panel 720 to display repair logs of the target system and related events contained in the respective repair logs, and each repair log has a fault tree associated with the target system. As shown, two repair logs "B07-AE03d" and "B01-AE031" as well as events associated with the first repair log are listed in the browser panel 720. A repair log that is written in a structured format can be imported directly by the software platform. Thus, information of maintenance activities (i.e., maintenance records) can be retrieved from the repair log. Based on the maintenance records, the reliability parameters can be calculated and updated automatically.

The fault tree display window 730 displays a fault tree 740 corresponding to the selected repair log ("B07-AE03d" in this example). For illustration purposes, the fault tree 740 shown here has identical structure as the fault tree 500 shown in FIG. 5. Two control elements 736 and 738 can be selected by a user to toggle between "Fault Tree Analysis" view (as shown) and "Failure Cause Probability" view (as described below). In the "Fault Tree Analysis" view, the user can click a "Run Analysis" button 732 to activate the failure diagnosis method described above. The analysis results can be saved in the database and retrieved by clicking the "History" button. Information of a selected basic event of the target system, e.g., picture of the corresponding component, reliability parameter of the component, etc., can be shown in the component display window 750 (the selected component is basic event B01 "Switcher Failure 1" in the depicted example).

Figure 8:
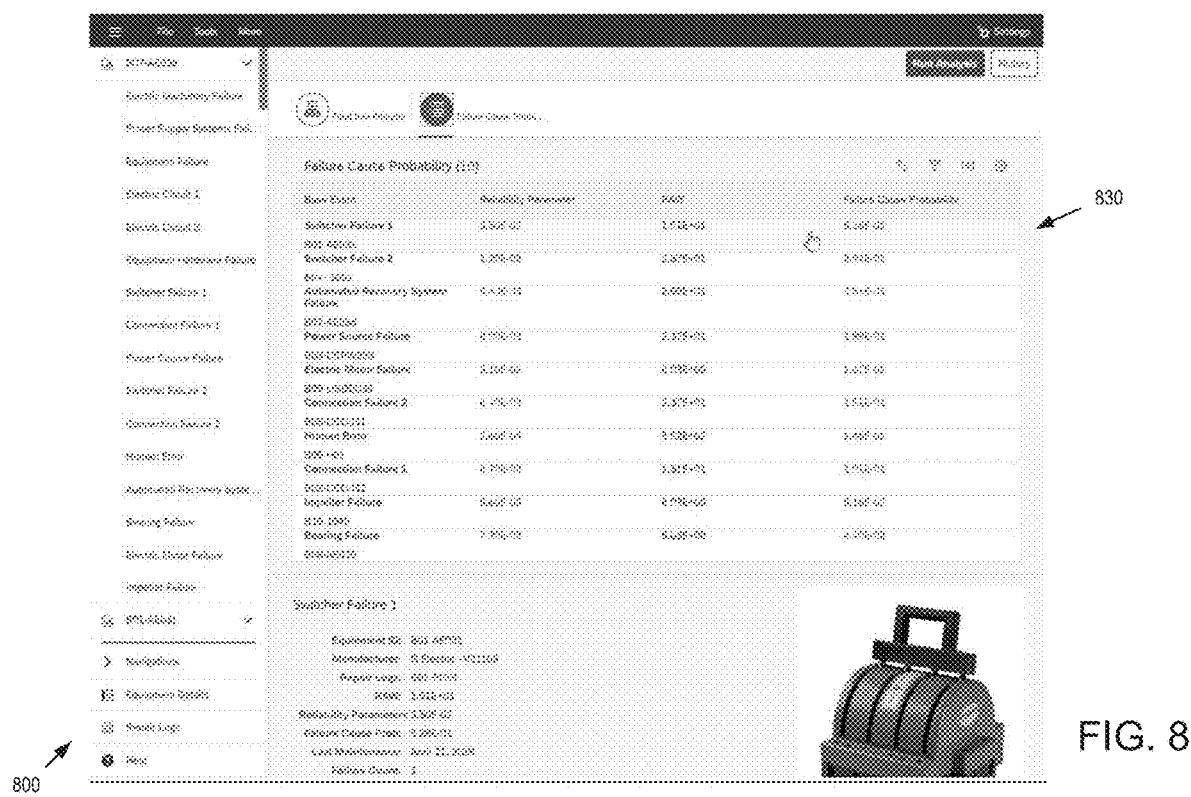
FIG. 8 is an example graphical user interface depicting the calculation of failure impact factors based on an initial set of reliability parameters corresponding to the basic events.

FIG. 8 shows the an example graphical user interface 800 showing the "Failure Cause Probability" view where the fault tree display window 730 is replaced by the "Failure Cause Probability" window 830, which shows the same results of failure diagnosis listed in Table I (the calculated FIFs are shown under the "Failure Cause Probability" column). As shown, the basic event B01 ("Switcher Failure 1") ranks top on the list of "Failure Cause Probability" (i.e., FIF) and is determined to be the MSC to the top event.

Figure 9:
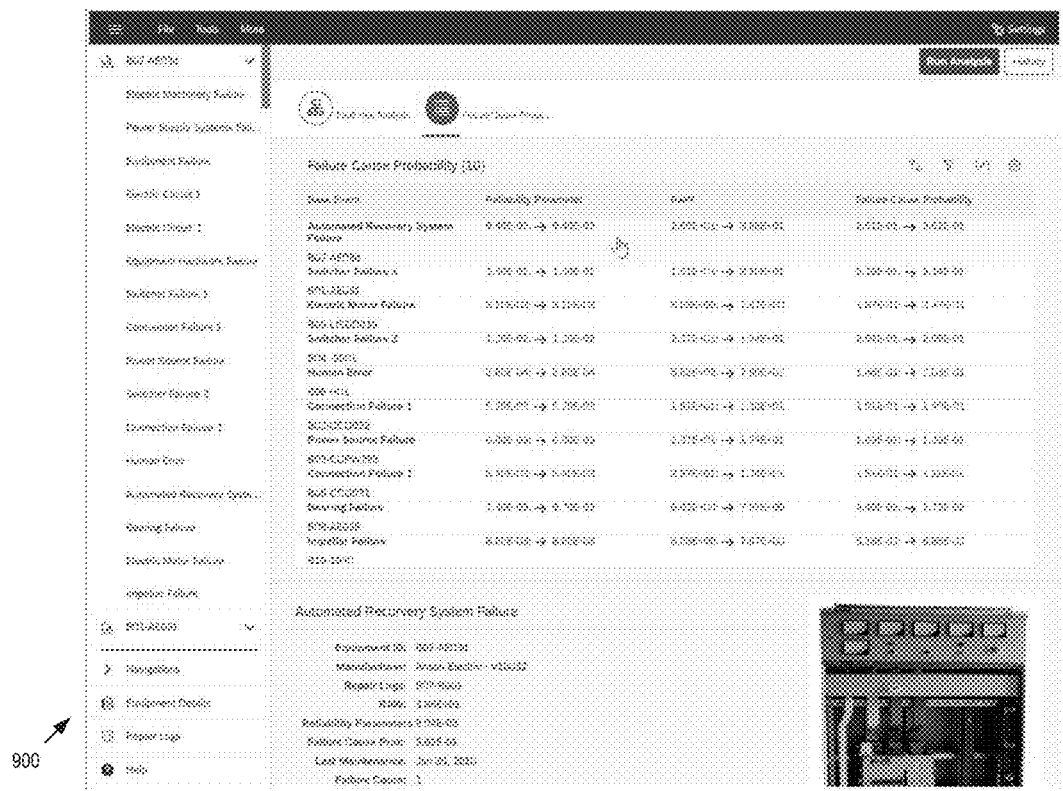
FIG. 9 is an example graphical user interface depicting the re-calculated failure impact factors after the reliability parameters corresponding to the basic events have been updated.

FIG. 9 shows an example graphical user interface 900 showing the "Failure Cause Probability" view after the reliability parameters corresponding to two basic events are changed and the "Failure Cause Probabilities" (i.e., FIF) are updated, displaying the same failure diagnosis listed in Table II. As shown, the basic event B07 ("Automated Recovery System Failure") now ranks top on the list of "Failure Cause Probability" (i.e., FIF) and is determined to be the MSC to the top event.

Figure 10:
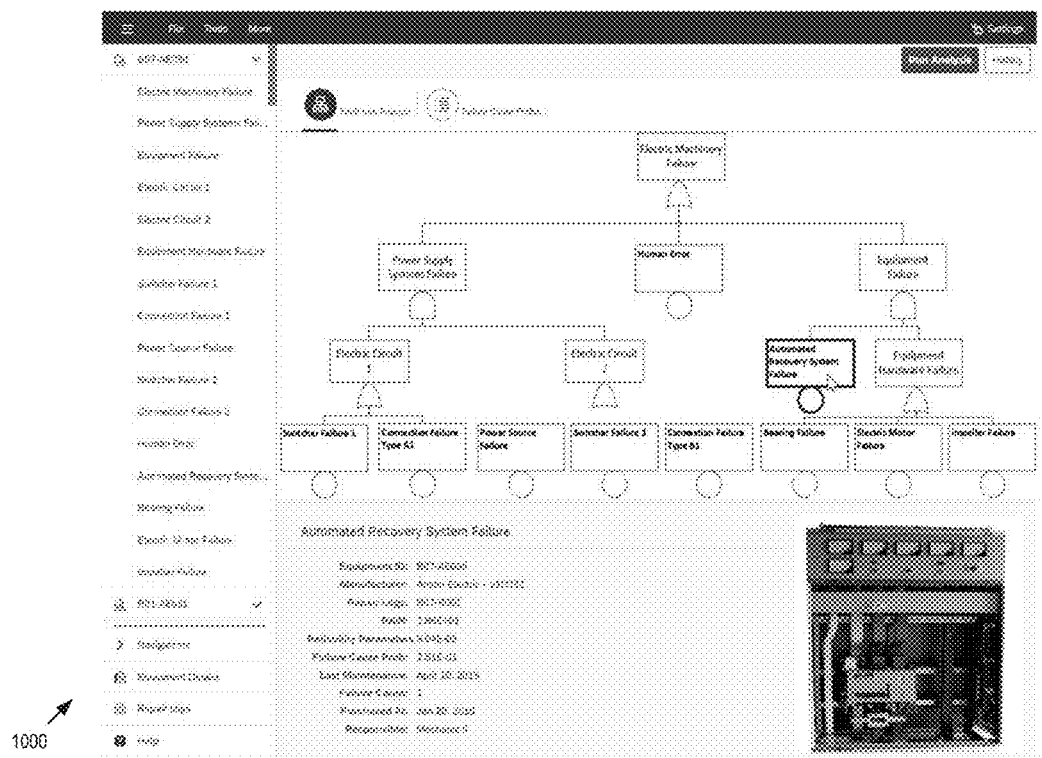
FIG. 10 is an example graphical user interface depicting a ranked list of potential causes of the system failure.

FIG. 10 shows an example "Fault Tree Analysis" view after updating the results of failure diagnosis depicted in FIG. 9. As shown, the basic event B07 is highlighted on the fault tree, creating an alert that the corresponding component failure (i.e., "Automated Recovery System Failure") is the most likely cause of the top event.

Example 13

Example Advantages

A number of advantages can be achieved via the technology described herein. For example, by applying Bayesian inference using a fault tree, the technology described herein takes into consideration both reliability parameters of components and fault tree importance measures in calculating failure impact factors, the ranking of which can reveal the most significant contributor to the top event of a target system. Thus, the technology described herein provides an easy, fast, and accurate means to diagnose the failure cause of the target system.

Furthermore, by incorporating the IoT cloud platform to link the failure analysis and diagnosis engine with various IoT sensors that measure operational conditions of the components of the target system, the technology described herein can dynamically assess risk profiles of the target system in response to changes in operative conditions of its components. Such on-the-fly intelligent monitoring of the target system allows a user of the system to proactively manage the risk of target system, for example, by means of preventative maintenances of components to mitigate the risk of critical system failure.

Example 14

Example Computing Systems

Figure 11:
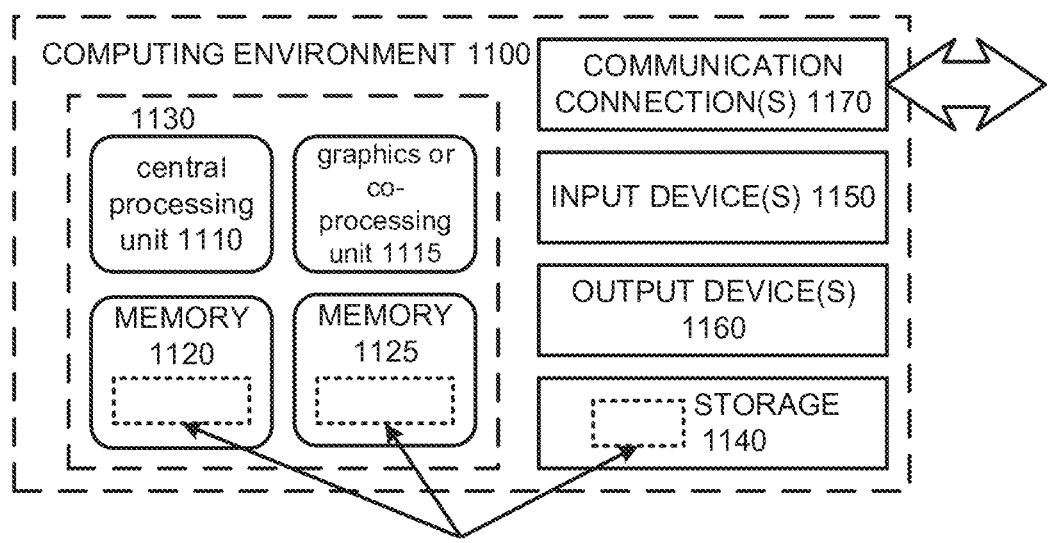
FIG. 11 is a block diagram of an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 can have additional features. For example, the computing system 1100 includes storage 1140, one or more input devices 1150, one or more output devices 1160, and one or more communication connections 1170, including input devices, output devices, and communication connections for interacting with a user. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 15

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 16

Example Cloud Computing Environment

Figure 12:
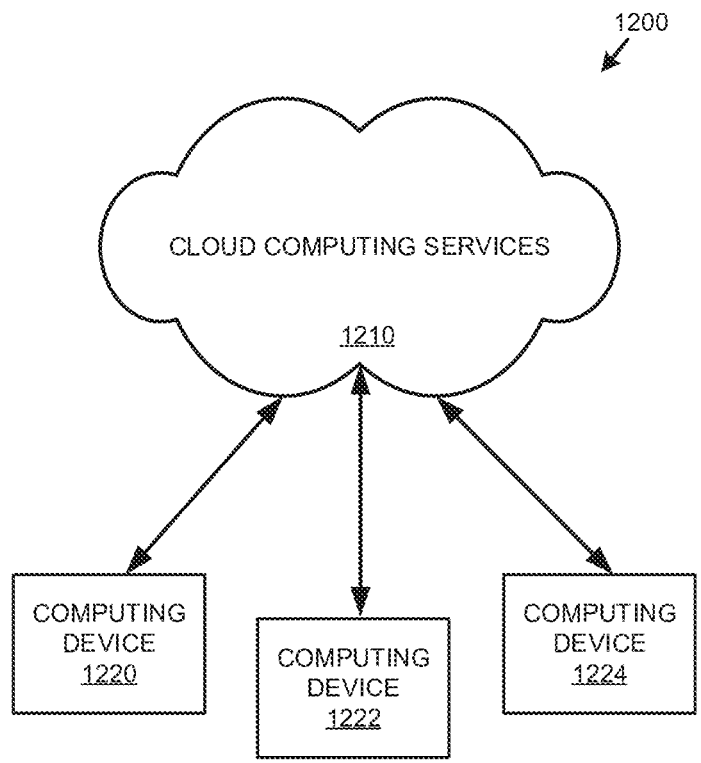
FIG. 12 is a block diagram of an example cloud computing environment that can be used in conjunction with the technologies described herein.

FIG. 12 depicts an example cloud computing environment 1200 in which the described technologies can be implemented, including, e.g., the system disclosed above and other systems herein. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1223. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example 17

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 18

Example Embodiments

Any of the following embodiments can be implemented.

Clause 1. A computer-implemented method comprising: receiving a fault tree comprising a node representing a top event, a plurality of nodes representing respective basic events, and one or more logic gates connecting the plurality of nodes representing the respective basic events to the node representing the top event; obtaining reliability parameters corresponding to the respective basic events; calculating fault tree importance measures corresponding to the respective basic events; calculating failure impact factors of the top event corresponding to the respective basic events based on the reliability parameters and the fault tree importance measures; ranking the respective basic events based on the failure impact factors of the top event; and identifying a most significant contributor to the top event, wherein the most significant contributor is a basic event having the highest failure cause probability of the top event.

Clause 2. The computer-implemented method of clause 1, further comprising updating one or more of the reliability parameters.

Clause 3. The computer-implemented method of clause 2, further comprising re-calculating the fault tree importance measures corresponding to the respective basic events and re-calculating the failure impact factors of the top event upon updating the one or more of the reliability parameters.

Clause 4. The computer-implemented method of clause 3, further comprising re-ranking the basic events and updating the most significant contributor to the top event upon updating the one or more of the reliability parameters.

Clause 5. The computer-implemented method of any one of clauses 2-4, wherein updating one or more of the reliability parameters comprises measuring failure probabilities of the respective basic events using a plurality of sensors connected to an internet-of-things (IoT) cloud service, and transmitting the measured failure probabilities to a failure analysis and diagnostic engine through a communication network.

Clause 6. The computer-implemented method of clause 5, wherein measuring failure probabilities of the respective basic event comprises registering the plurality of sensors with an IoT device manager of the IoT cloud service, wherein the IoT device manager establishes credentials for the plurality of sensors to access the IoT cloud service, receives data stream measured by the plurality of sensors, and defines communication protocols between the plurality of sensors and the IoT cloud service.

Clause 7. The computer-implemented method of clause 6, wherein transmitting the measured failure probabilities to the failure analysis and diagnostic engine comprises processing data stream measured by the plurality of sensors by an IoT message processing unit of the IoT cloud service to calculate the measured failure probabilities, wherein the IoT message processing unit further defines communication protocols between the IoT cloud service and the failure analysis and diagnostic engine.

Clause 8. The computer-implemented method of any one of clauses 1-7, further comprising generating an alert and displaying the most significant contributor to the top event on a graphical user interface.

Clause 9. The computer-implemented method of any one of clauses 1-8, wherein the fault tree importance measures comprise risk achievement worth corresponding to a basic event, the risk achievement worth being calculated as a ratio of (i) a probability of the top event conditioned on setting a probability of the basic event to one, and (ii) a probability of the top event; and wherein the failure impact factors of the top event are products of the corresponding reliability parameters and the corresponding fault tree importance measures.

Clause 10. The computer-implemented method of clause 9, further comprising decomposing the fault tree into one or more minimal cut sets and calculating probabilities corresponding to the one or more minimal cut sets, wherein the probability of the top event is calculated based on probabilities corresponding to the one or more minimal cut sets.

Clause 11. A system comprising:
one or more processors; and memory coupled to the one or more processors comprising instructions causing the one or more processors to perform a method comprising:
receiving a fault tree comprising a node representing a top event, a plurality of nodes representing respective basic events, and one or more logic gates connecting the plurality of nodes representing the respective basic events to the node representing the top event; obtaining reliability parameters corresponding to the respective basic events; calculating fault tree importance measures corresponding to the respective basic events; calculating failure impact factors of the top event corresponding to the respective basic events based on the reliability parameters and the fault tree importance measures; ranking the respective basic events based on the failure impact factors of the top event; and identifying a most significant contributor to the top event, wherein the most significant contributor is a basic event having the highest failure cause probability of the top event.

Clause 12. The system of clause 11, wherein the method is further configured to update one or more of the reliability parameters.

Clause 13. The system of clause 12, wherein the method is further configured to re-calculate fault tree importance measures corresponding to the respective basic events and re-calculate failure impact factors of the top event upon updating the one or more of the reliability parameters.

Clause 14. The system of clause 13, wherein the method is further configured to re-rank the respective basic events and update the most significant contributor of the top event upon updating the one or more of the reliability parameters.

Clause 15. The system of any one of clauses 12-14, further comprising a plurality of sensors connected to an internet-of-things (IoT) cloud service, wherein updating one or more of the reliability parameters comprises measuring failure probabilities of the respective basic events using the plurality of sensors, and transmitting the measured failure probabilities to a failure analysis and diagnostic engine through a communication network.

Clause 16. The system of clause 15, wherein measuring failure probabilities of the basic event comprises registering the plurality of sensors with an IoT device manager of the IoT cloud service, wherein the IoT device manager establishes credentials for the plurality of sensors to access the IoT cloud service, receives data stream measured by the plurality of sensors, and defines communication protocols between the plurality of sensors and the IoT cloud service.

Clause 17. The system of clause 16, wherein transmitting the measured failure probabilities to the failure analysis and diagnostic engine comprises processing data stream measured by the plurality of sensors by an IoT message processing unit of the IoT cloud service to calculate the measured failure probabilities, wherein the IoT message processing unit further defines communication protocols between the IoT cloud service and the failure analysis and diagnostic engine.

Clause 18. The system of any one of clauses 11-17, further comprising a graphical user interface configured to generate an alert and display the most significant contributor to the top event.

Clause 19. The system of any one of clauses 11-18, wherein the fault tree importance measures comprise risk achievement worth corresponding to a basic event, the risk achievement worth being calculated as a ratio of (i) a probability of the top event conditioned on setting a probability of the basic event to one, and (ii) a probability of the top event; and wherein the failure impact factors of the top event are products of the corresponding reliability parameters and the corresponding fault tree importance measures.

Clause 20. One or more computer-readable media having encoded thereon computer-executable instructions causing one or more processors to perform a method comprising:

receiving a fault tree comprising a node representing a top event, a plurality of nodes representing respective basic events, and one or more logic gates connecting the plurality of nodes representing the respective basic events to the node representing the top event; obtaining reliability parameters corresponding to the respective basic events; calculating fault tree importance measures corresponding to the respective basic events; calculating failure impact factors of the top event corresponding to the respective basic events, wherein the failure impact factors of the top event are products of the corresponding reliability parameters and the corresponding fault tree importance measures; ranking the respective basic events based on the failure impact factors of the top event; identifying a most significant contributor to the top event, wherein the most significant contributor is a basic event having the highest failure cause probability of the top event; updating one or more of the reliability parameters; re-calculating the fault tree importance measures corresponding to the respective basic events and re-calculating the failure impact factors of the top event upon updating the one or more of the reliability parameters; re-ranking the respective basic events and updating the most significant contributor to the top event upon updating the one or more of the reliability parameters; and updating one or more of the reliability parameters comprises measuring failure probabilities of the respective basic events using a plurality of sensors connected to an internet-of-things (IoT) cloud service and transmitting the measured failure probabilities to a failure analysis and diagnostic engine through a communication network.

Example 19

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
  receiving a fault tree comprising a node representing a top event, a plurality of nodes representing respective basic events, and one or more logic gates connecting the plurality of nodes representing the respective basic events to the node representing the top event;
  obtaining reliability parameters corresponding to the respective basic events;
  calculating fault tree importance measures corresponding to the respective basic events, wherein the fault tree importance measures comprise risk achievement worth corresponding to a basic event, the risk achievement worth being calculated as a ratio of (i) a probability of the top event conditioned on setting a probability of the basic event to one, and (ii) a probability of the top event;
  calculating failure impact factors of the top event corresponding to the respective basic events, wherein the failure impact factors of the top event comprise conditional probabilities of the respective basic events determined based on respective products of the reliability parameters and the fault tree importance measures;
  ranking the respective basic events based on the failure impact factors of the top event; and
  identifying a most significant contributor to the top event, wherein the most significant contributor is a basic event having the highest failure impact factor of the top event.

2. The computer-implemented method of claim 1, further comprising updating one or more of the reliability parameters.

3. The computer-implemented method of claim 2, further comprising re-calculating the fault tree importance measures corresponding to the respective basic events and re-calculating the failure impact factors of the top event upon updating the one or more of the reliability parameters.

4. The computer-implemented method of claim 3, further comprising re-ranking the basic events and updating the most significant contributor to the top event upon updating the one or more of the reliability parameters.

5. The computer-implemented method of claim 2, wherein updating one or more of the reliability parameters comprises measuring failure probabilities of the respective basic events using a plurality of sensors connected to an internet-of-things (IoT) cloud service, and transmitting the measured failure probabilities to a failure analysis and diagnostic engine through a communication network.

6. The computer-implemented method of claim 5, wherein measuring failure probabilities of the respective basic event comprises registering the plurality of sensors with an IoT device manager of the IoT cloud service, wherein the IoT device manager establishes credentials for the plurality of sensors to access the IoT cloud service, receives data stream measured by the plurality of sensors, and defines communication protocols between the plurality of sensors and the IoT cloud service.

7. The computer-implemented method of claim 6, wherein transmitting the measured failure probabilities to the failure analysis and diagnostic engine comprises processing data stream measured by the plurality of sensors by an IoT message processing unit of the IoT cloud service to calculate the measured failure probabilities, wherein the IoT message processing unit further defines communication protocols between the IoT cloud service and the failure analysis and diagnostic engine.

8. The computer-implemented method of claim 1, further comprising generating an alert and displaying the most significant contributor to the top event on a graphical user interface.

9. The computer-implemented method of claim 1, further comprising decomposing the fault tree into one or more minimal cut sets and calculating probabilities corresponding to the one or more minimal cut sets, wherein the probability of the top event is calculated based on probabilities corresponding to the one or more minimal cut sets.

10. A system comprising:
one or more processors; and
memory coupled to the one or more processors comprising instructions causing the one or more processors to perform a method comprising:
receiving a fault tree comprising a node representing a top event, a plurality of nodes representing respective basic events, and one or more logic gates connecting the plurality of nodes representing the respective basic events to the node representing the top event;
obtaining reliability parameters corresponding to the respective basic events;
calculating fault tree importance measures corresponding to the respective basic events, wherein the fault tree importance measures comprise risk achievement worth corresponding to a basic event, the risk achievement worth being calculated as a ratio of (i) a probability of the top event conditioned on setting a probability of the basic event to one, and (ii) a probability of the top event;
calculating failure impact factors of the top event corresponding to the respective basic events, wherein the failure impact factors of the top event comprise conditional probabilities of the respective basic events determined based on respective products of the reliability parameters and the fault tree importance measures;
ranking the respective basic events based on the failure impact factors of the top event; and
identifying a most significant contributor to the top event, wherein the most significant contributor is a basic event having the highest failure impact factor of the top event.

11. The system of claim 10, wherein the method is further configured to update one or more of the reliability parameters.

12. The system of claim 11, wherein the method is further configured to re-calculate fault tree importance measures corresponding to the respective basic events and re-calculate failure impact factors of the top event upon updating the one or more of the reliability parameters.

13. The system of claim 12, wherein the method is further configured to re-rank the respective basic events and update the most significant contributor of the top event upon updating the one or more of the reliability parameters.

14. The system of claim 11, further comprising a plurality of sensors connected to an internet-of-things (IoT) cloud service, wherein updating one or more of the reliability parameters comprises measuring failure probabilities of the respective basic events using the plurality of sensors, and transmitting the measured failure probabilities to a failure analysis and diagnostic engine through a communication network.

15. The system of claim 14, wherein measuring failure probabilities of the basic event comprises registering the plurality of sensors with an IoT device manager of the IoT cloud service, wherein the IoT device manager establishes credentials for the plurality of sensors to access the IoT cloud service, receives data stream measured by the plurality of sensors, and defines communication protocols between the plurality of sensors and the IoT cloud service.

16. The system of claim 15, wherein transmitting the measured failure probabilities to the failure analysis and diagnostic engine comprises processing data stream measured by the plurality of sensors by an IoT message processing unit of the IoT cloud service to calculate the measured failure probabilities, wherein the IoT message processing unit further defines communication protocols between the IoT cloud service and the failure analysis and diagnostic engine.

17. The system of claim 10, further comprising a graphical user interface configured to generate an alert and display the most significant contributor to the top event.

18. One or more non-transitory computer-readable media having encoded thereon computer-executable instructions causing one or more processors to perform a method comprising:
receiving a fault tree comprising a node representing a top event, a plurality of nodes representing respective basic events, and one or more logic gates connecting the plurality of nodes representing the respective basic events to the node representing the top event;
obtaining reliability parameters corresponding to the respective basic events;
calculating fault tree importance measures corresponding to the respective basic events, wherein the fault tree importance measures comprise risk achievement worth corresponding to a basic event, the risk achievement worth being calculated as a ratio of (i) a probability of the top event conditioned on setting a probability of the basic event to one, and (ii) a probability of the top event;
calculating failure impact factors of the top event corresponding to the respective basic events, wherein the failure impact factors of the top event comprise conditional probabilities of the respective basic events determined based on respective products of the corresponding reliability parameters and the corresponding fault tree importance measures;
ranking the respective basic events based on the failure impact factors of the top event;
identifying a most significant contributor to the top event, wherein the most significant contributor is a basic event having the highest failure impact factor of the top event;
updating one or more of the reliability parameters;
re-calculating the fault tree importance measures corresponding to the respective basic events and re-calculating the failure impact factors of the top event upon updating the one or more of the reliability parameters; and re-ranking the respective basic events and updating the most significant contributor to the top event upon updating the one or more of the reliability parameters;

wherein updating one or more of the reliability parameters comprises measuring failure probabilities of the respective basic events using a plurality of sensors connected to an internet-of-things (IoT) cloud service and transmitting the measured failure probabilities to a failure analysis and diagnostic engine through a communication network.

* * * * *